US009255856B2

(12) United States Patent
Takahashi

(10) Patent No.: US 9,255,856 B2
(45) Date of Patent: Feb. 9, 2016

(54) DYNAMOMETER SYSTEM

(71) Applicant: MEIDENSHA CORPORATION, Tokyo (JP)

(72) Inventor: Toshimichi Takahashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 14/381,858

(22) PCT Filed: Feb. 27, 2013

(86) PCT No.: PCT/JP2013/055255
§ 371 (c)(1),
(2) Date: Aug. 28, 2014

(87) PCT Pub. No.: WO2013/129533
PCT Pub. Date: Sep. 6, 2013

(65) Prior Publication Data
US 2015/0039246 A1    Feb. 5, 2015

(30) Foreign Application Priority Data

Mar. 2, 2012 (JP) .................................. 2012-047073

(51) Int. Cl.
*G01L 5/24* (2006.01)
*G01L 3/10* (2006.01)
*G01M 15/02* (2006.01)

(52) U.S. Cl.
CPC ... *G01L 3/10* (2013.01); *G01L 5/24* (2013.01); *G01M 15/02* (2013.01)

(58) Field of Classification Search
CPC ..................................... G01L 3/10; G01L 5/24

USPC ............................................................ 702/41
See application file for complete search history.

(56) References Cited

U.S. PATENT DOCUMENTS

2015/0101421 A1*    4/2015    Takahashi ................ 73/862.325

FOREIGN PATENT DOCUMENTS

| JP | 2003-302312 | 10/2003 |
| JP | 2003-328850 | 11/2003 |
| JP | 2009-109309 | 5/2009 |
| JP | 2010-019652 | 1/2010 |
| JP | 2010-112901 | 5/2010 |
| JP | 2011-257205 | 12/2011 |

* cited by examiner

*Primary Examiner* — Bryan Bui
(74) *Attorney, Agent, or Firm* — Muncy, Geissler, Olds & Lowe P.C.

(57) ABSTRACT

Provided is a dynamometer system provided with a shaft-torque meter, and capable of an equivalent evaluation to that of a system provided with a load cell. A dynamometer system is provided with an encoder for detecting the angular velocity, a shaft-torque meter for detecting the shaft torque, and a control device (6A) for controlling the dynamometer on the basis of the angular velocity (omegaM) of the dynamometer and the detection value (Tsh) of the shaft-torque meter. The torque-control device (6A) is provided with: a computed-torque calculation unit (61A) for calculating a computed-torque value (Tcal) by adding the detection value (Tsh) to a value obtained by multiplying the angular acceleration (omegaMss) by the moment of inertia (TM); and a computed-torque controller (62A) for calculating a torque-current-command value (Tdyref), on the basis of an externally inputted command value (Tref) and a computed-torque value (Tcal).

12 Claims, 8 Drawing Sheets

DYNAMOMETER SYSTEM

TECHNICAL FIELD

The present invention relates to a dynamometer system. In more detail, it relates to a dynamometer system including an encoder that detects an angular velocity of a dynamometer, and a shaft-torque meter that detects the shaft torque between a load device and the dynamometer, and controlling the dynamometer based on the detection values of these.

BACKGROUND ART

With a dynamometer system, by connecting a load device such as an electric motor, engine and roller with a dynamometer that absorbs the dynamic force generated by this load device with a common shaft, as well as controlling the dynamometer based on the detection signals of various sensors detecting the angular velocity, torque, etc., and controlling the output of the load device while applying an appropriate load to the load device, various performance tests thereof are carried out.

Such dynamometer systems are roughly classified into two types based on the difference in the torque detection means.

One is a system equipped with an oscillation-type dynamometer like that shown in Patent Document 1. With this system, an oscillator provided to the dynamometer is supported to freely swing via a floating bearing over a base, and between a leading end of a torque arm of this oscillator and the base are coupled by a load cell, torque is detected from the deformation detected by this load cell, and a control system is constructed with this as a controlled variable.

The other one is a non-oscillation-type system, i.e. provided on a base so as not to allow the dynamometer to oscillate as mentioned above. With this system, since detection of torque using the above-mentioned load cell becomes difficult, a control system is constructed that detects the shaft torque between the dynamometer and load device by a shaft-torque meter as shown in Cited Publication 2, and defines this as a controlled variable.

Patent Document 1: Japanese Unexamined Patent Application, Publication No. 2009-109309
Patent Document 2: Japanese Unexamined Patent Application, Publication No. 2011-257205

DISCLOSURE OF THE INVENTION

Problems to be Solved by the Invention

As mentioned above, with the system using a load cell and the system using a shaft-torque meter, differences may arise in the performance test results during acceleration and deceleration caused by variation in the torque detection means, and thus there has been a problem in that uniform evaluation is difficult with both systems.

The present invention has an object of providing a dynamometer system equipped with a shaft-torque meter, enabling evaluation of equivalence with a system equipped with a load cell.

Means for Solving the Problems

In order to achieve the above-mentioned object, a first aspect of the present invention provides a dynamometer system including:
a dynamometer (e.g., the dynamometer 2 described later) that is connected by a common shaft (e.g., the shaft S described later) to a load device (e.g., the electric motor 9 described later); an inverter (e.g., the inverter 3 described later) that supplies electric power to the dynamometer; an encoder (e.g., the encoder 4 described later) that detects an angular velocity of the dynamometer; a shaft-torque meter (e.g., the shaft-torque meter 5 described later) that detects shaft torque between the load device and the dynamometer; and a control device (e.g., the torque-control device 6, 6A, 6B, 6B', 6C, 6C' described later) that controls the dynamometer based on a detection value of the encoder and a detection value of the shaft-torque meter. The control device includes: a calculated-torque calculation unit (e.g., the calculated-torque calculation unit 61A described later) that calculates a calculated-torque value (Tcal) by totaling a value arrived at by multiplying the moment of inertia (JM) of the dynamometer by the angular acceleration ($\omega$M·s) of the dynamometer calculated from the detection value ($\omega$M) of the encoder, and the detection value (Tsh) of the shaft-torque meter; and a calculated-torque controller (e.g., the calculated-torque controller 62A) that calculates a torque-current-command value (Tdyref, T1) to serve as an input to the inverter, based on a command value (Tref) relative to the calculated-torque value inputted externally, and the calculated-torque value (Tcal).

According to the first aspect of the present invention, by totaling a value arrived at by multiplying the moment of inertia of the dynamometer by the angular acceleration of the dynamometer calculated from the detection value of the encoder, and the detection value of the shaft-torque meter, the calculated-torque value corresponding to the detection value of the aforementioned load cell is calculated, and the torque-current-command value is calculated by the calculated-torque controller with the calculated-torque value as a controlled variable according to the command value input externally. Since control (calculated-dynamo-torque control) equivalent to torque control defining the detection value of the load cell as the controlled variable is performed in the system equipped with a shaft-torque meter, it is possible to perform evaluation of equivalence with the system equipped with a load cell.

According to a second aspect, in this case, it is preferable for the calculated-torque calculation unit to calculate the calculated-torque value by way of the formula (1) below, where Tsh is the detection value of the shaft-torque meter, JM is the moment of inertia of the dynamometer, $\omega$M is the detection value of the encoder, s is a Laplace operator, $\omega$cL is a cut-off frequency, n is any positive integer of at least 1, and $a_n$ is a predetermined low-pass filter characteristic constant.

$$Tcal = \frac{Tsh}{(s/\omega cL)^n + a_{n-1}(s/\omega cL)^{n-1} + \ldots + 1} + \frac{JM \cdot \omega M \cdot s}{(s/\omega CL)^n + a_{n-1}(s/\omega cL)^{n-1} + \ldots + 1} \quad (1)$$

In the second aspect of the present invention, by defining the calculated-torque value Tcal with a value arrived at by multiplying an $n^{th}$-order Butterworth-type filter by the ideal value (Tsh+JM·$\omega$M·s) of the calculated torque corresponding to the detection value of the load cell, as shown in the formula (1) above, the calculated-torque value Tcal can be made to match the characteristic of the load cell, as well as being able to make a value with good properties free of an exact derivative term.

According to a third aspect, in this case, it is preferable for the calculated-torque controller to have a PI control structure characterized by a proportional gain KP and integration time constant Ti, and for the proportional gain KP and the integration time constant Ti to be determined by way of the formula (2) below, using a cut-off frequency ωcL of the calculated-torque calculation unit and any frequency response setting value ωc determined between 0 and the cut-off frequency ωcL.

$$KP = \frac{\omega c}{\omega cL},$$
$$Ti = \frac{1}{\omega CL}$$
(2)

According to the third aspect, since adjustable parameters of the controller such as the proportional gain and integration time constant interact with one another, time is required in adjustment thereof, and a difference arises in the adjustment results depending on the person making adjustments, as well as there being a risk of difference arising in the evaluation results depending on the system. In the present invention, by determining the proportional gain KP and integration time constant Ti of the calculated-torque controller by the cut-off frequency ωcL introduced to the calculated-torque value and any frequency response setting value ωc set between 0 and ωcL as shown in formula (2) above, the adjustment of adjustable parameters is facilitated, as well as being able to resolve the uncertainty depending on the person making adjustment to the utmost; therefore, more uniform evaluation becomes possible. In addition, by determining the adjustable parameter in this way, in the case of controlling according to the settings and a stable result not being obtained, it is conversely possible to assume that there is a malfunction in the system.

According to a fourth aspect, in this case, it is preferable for the calculated-torque controller to have a PI control structure characterized by a proportional gain KP and integration time constant Ti, and for the frequency response characteristic from input (Tdyref) to the inverter to output (Tcal) of the calculated-torque calculation unit to be equivalent to the frequency response characteristic of a first-order lag low-pass filter characterized by the cut-off frequency ωcL (e.g., formula (9) described later), and under the condition of an open-loop transfer function (Go) having an integral characteristic characterized by any frequency response setting value ωc determined between 0 and the cut-off frequency ωcL (e.g., formulas (10) and (11) described later), for the proportional gain KP and integration time constant Ti to be determined by the cut-off frequency ωcL and the frequency response setting value ωc.

According to the fourth aspect of the present invention, adjustment of adjustable parameters of the calculated-torque controller is facilitated, and the uncertainty depending on the person making adjustment can be resolved to the utmost; therefore, more uniform evaluation becomes possible.

According to a fifth aspect, in this case, it is preferable for the control device to further include a shaft-torque-detection compensation unit that adds a compensation amount obtained by multiplying a filter transfer function and a suppression gain by the detection value of the shaft-torque meter, to the torque-current-command value calculated by the main control unit, so as to correct the torque-current-command value, and for the filter transfer function of the shaft-torque-detection compensation unit to be set with only a resonance frequency of a mechanical system consisting of the load device and the dynamometer and a vicinity thereof as a passband.

According to the fifth aspect of the present invention, by correcting, by way of the shaft-torque-detection compensation unit, the torque-current-command value calculated by the calculated-torque controller with a value arrived at by multiplying the suppression gain by the detection value of the shaft-torque meter, the resonance gain of the mechanical system consisting of the load device and dynamometer is suppressed, and thus highly-responsive calculated dynamo-torque control becomes possible.

Incidentally, when considering the noise of the shaft-torque meter, appropriate correction over the entire frequency band becomes difficult with only the above-mentioned shaft-torque-detection compensation unit using the detection value of the shaft-torque meter, and a case is also assumed in which it is more preferable to combine with another compensator such as a disturbance observer. Therefore, in the present invention, the shaft-torque-detection compensation unit multiplies the filter transfer function set with only the resonance frequency of the mechanical system consisting of the load device and dynamometer and the vicinity thereof as the passband, by the detection value of the shaft-torque meter. In other words, by configuring to compensate only the resonance frequency band of the mechanical system, in the case of using in combination with another compensator, the shaft-torque-detection compensation unit suppresses the interference with this, a result of which stable torque control becomes possible over the entire frequency band.

According to a sixth aspect, in this case, it is preferable for the filter transfer function of the shaft-torque-detection compensation unit to be a bandpass filter set so that the resonance frequency of the mechanical system is included in the bandwidth thereof.

According to the sixth aspect of the present invention, by establishing the filter transfer function as a bandpass filter set so that the resonance frequency is included in the bandwidth thereof, the effect of the above-mentioned fifth aspect can be more reliably exerted.

According to a seventh aspect, in this case, it is preferable for the filter transfer function of the shaft-torque-detection compensation unit to be configured by connecting a high-pass filter having a cut-off frequency lower than the resonance frequency in series to a low-pass filter having a cut-off frequency higher than the resonance frequency.

According to the seventh aspect of the present invention, by configuring the filter transfer function having the characteristic of a bandpass filter by connecting a low-pass filter and a high-pass filter in series, it is possible to exert similar effects as the above-mentioned sixth aspect. It should be noted that, comparing with a bandpass filter, a configuration combining a low-pass filter and a high-pass filter can set a wider bandwidth; therefore, it is possible to improve the degree of freedom in design of the shaft-torque-detection compensation unit when compared with the above-mentioned sixth aspect of the invention.

According to an eighth aspect, in this case, it is preferable for the shaft-torque-detection compensation unit to be configured by joining in parallel a plurality of filter transfer functions and suppression gains thereof set for each of the resonance frequencies, for a plurality of resonance frequencies of the mechanical system.

According to the eighth aspect, since a plurality of resonance frequencies are generally present, by joining the filter transfer function and the suppression gain thereof set for each resonance frequency in parallel, the present invention can suitably suppress each resonance gain.

Figure 1:
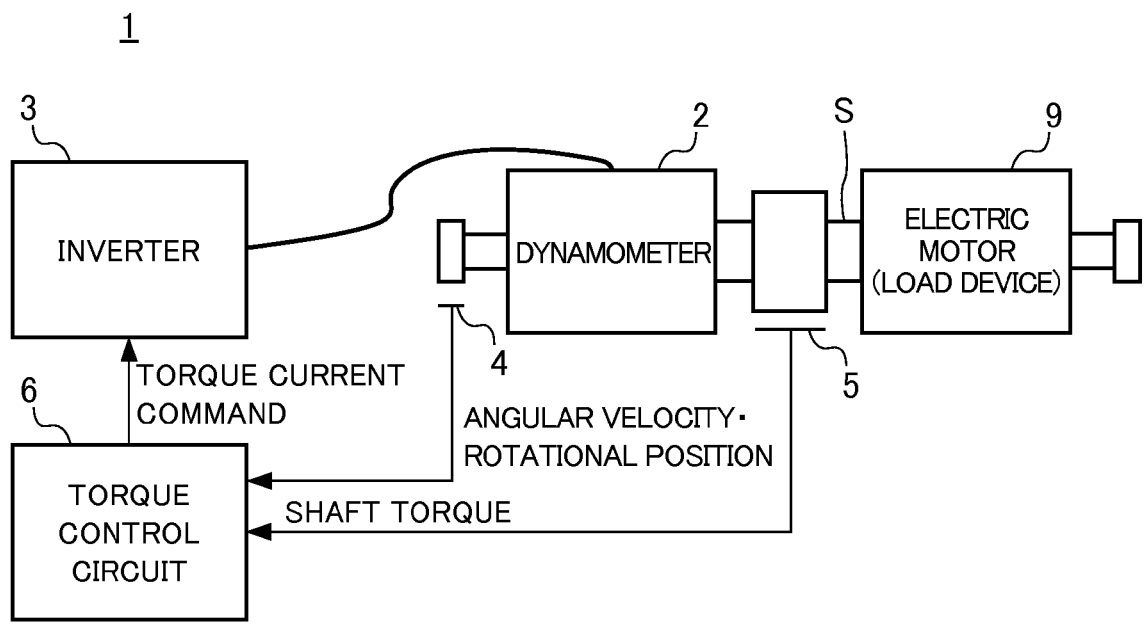
FIG. 1 is a block diagram showing the configuration of a dynamometer system according to an embodiment of the present invention.

EXPLANATION OF REFERENCE NUMERALS 1 dynamometer system
2 dynamometer
3 inverter
4 encoder
5 shaft-torque meter
6, 6A, 6A', 6B, 6B', 6C, 6C' torque-control device (control device)
61A calculated-torque calculation unit
62A calculated-torque controller
63B, 63B', 63C, 63C' shaft-torque-detection compensation unit

PREFERRED MODE FOR CARRYING OUT THE INVENTION

Hereinafter, a dynamometer system according to an embodiment of the present invention will be explained in detail while referencing the drawings.

FIG. 1 is a block diagram showing the configuration of a dynamometer system 1 of the present embodiment.

The dynamometer system 1 includes: a dynamometer 2 connected with a common shaft S with an electric motor 9 as a load device; an inverter 3 that supplies electric power to this dynamometer 2; an encoder 4 that detects the angular velocity of the dynamometer 2; a shaft-torque meter 5 that detects the shaft torque between the electric motor 9 and the dynamometer 2; and a torque-control device 6 that controls the torque of the dynamometer 2 based on the detection values of this encoder 4 and shaft-torque meter 5.

The encoder 4 detects the angular velocity of the dynamometer 2, and sends a signal substantially proportional to the detection value to the torque-control device 6. The shaft-torque meter 5 detects shaft torque acting on the shaft S between the electric motor 9 and dynamometer 2 from the amount of deformation in a twisting direction of the shaft, for example, and sends a signal substantially proportion to the detection value to the torque-control device 6.

The inverter 3 converts direct-current power supplied from a direct-current power source that is not illustrated, into alternating-current power, and then supplies to the dynamometer 2. The torque-control device 6 determines a torque-current-command value that is an input to the inverter 3, based on the detection value of the encoder 4, the detection value of the shaft-torque meter 5, and the torque-command value input externally. The detailed configuration of this torque-control device 6 will be explained in each of the examples later.

With the dynamometer system 1, by controlling the torque of the dynamometer 2 with the above-mentioned torque-control device 6 and controlling the output of the electric motor 9 while applying an appropriate load to the electric motor 9, various performance tests thereof are carried out.

EXAMPLES

Example 1

Next, Example 1 of the speed-control device of the above-mentioned embodiment will be explained in detail while referencing the drawings. In the following explanation of the Examples, the configuration of the mechanical system of the dynamometer system is defined as a 2-inertia system model like that shown in FIG. 2.

Figure 2:
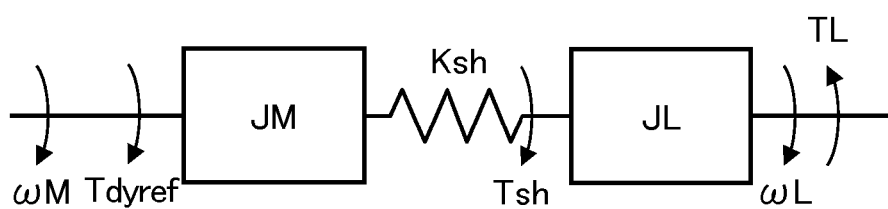
FIG. 2 is a diagram showing the configuration of 2-inertia system model.

In FIG. 2, "JM" is the inertia moment (kgm$^2$) of the dynamometer.

"JL" is the inertia moment (kgm$^2$) of the electric motor (load device).

"Ksh" is the spring stiffness (Nm/rad) of the shaft between the dynamometer and electric motor.

"ωM" is the angular velocity (rad/s) of the dynamometer, and corresponds to the detection value of the encoder. Hereinafter, it is referred to as dynamometer angular velocity.

"ωL" is the angular velocity (rad/s) of the electric motor.

"TL" is the drive torque (Nm) of the electric motor.

"Tsh" is the shaft torque (Nm) acting on the shaft between the dynamometer and electric motor, and corresponds to the detection value of the shaft-torque meter. Hereinafter, it is referred to as shaft-torque meter detection value.

"Tdyref" is the drive torque (Nm) of the dynamometer, and corresponds to the input to the inverter. Hereinafter, it is referred to as torque-current-command value. It should be noted that, in the system equipped with the aforementioned oscillation-type dynamometer and load cell, the drive torque of the dynamometer is considered to correspond approximately to the detection value of the load cell.

In the following explanation, although the rotating loss (Nms/rad) or spring loss (Nms/rad) are omitted from explanation, the present invention is not limited thereto.

When Laplace transforming the equation of motion of the 2-inertia system model shown in FIG. 2, the below formulas (3-1) to (3-3) are derived.

$$JL \cdot \omega L \cdot s = TL + Tsh \qquad (3\text{-}1)$$

$$Tsh = \frac{Ksh}{s}(\omega M - \omega L) \qquad (3\text{-}2)$$

$$JM \cdot \omega M \cdot s = Tdyref - Tsh \qquad (3\text{-}3)$$

Figure 3:
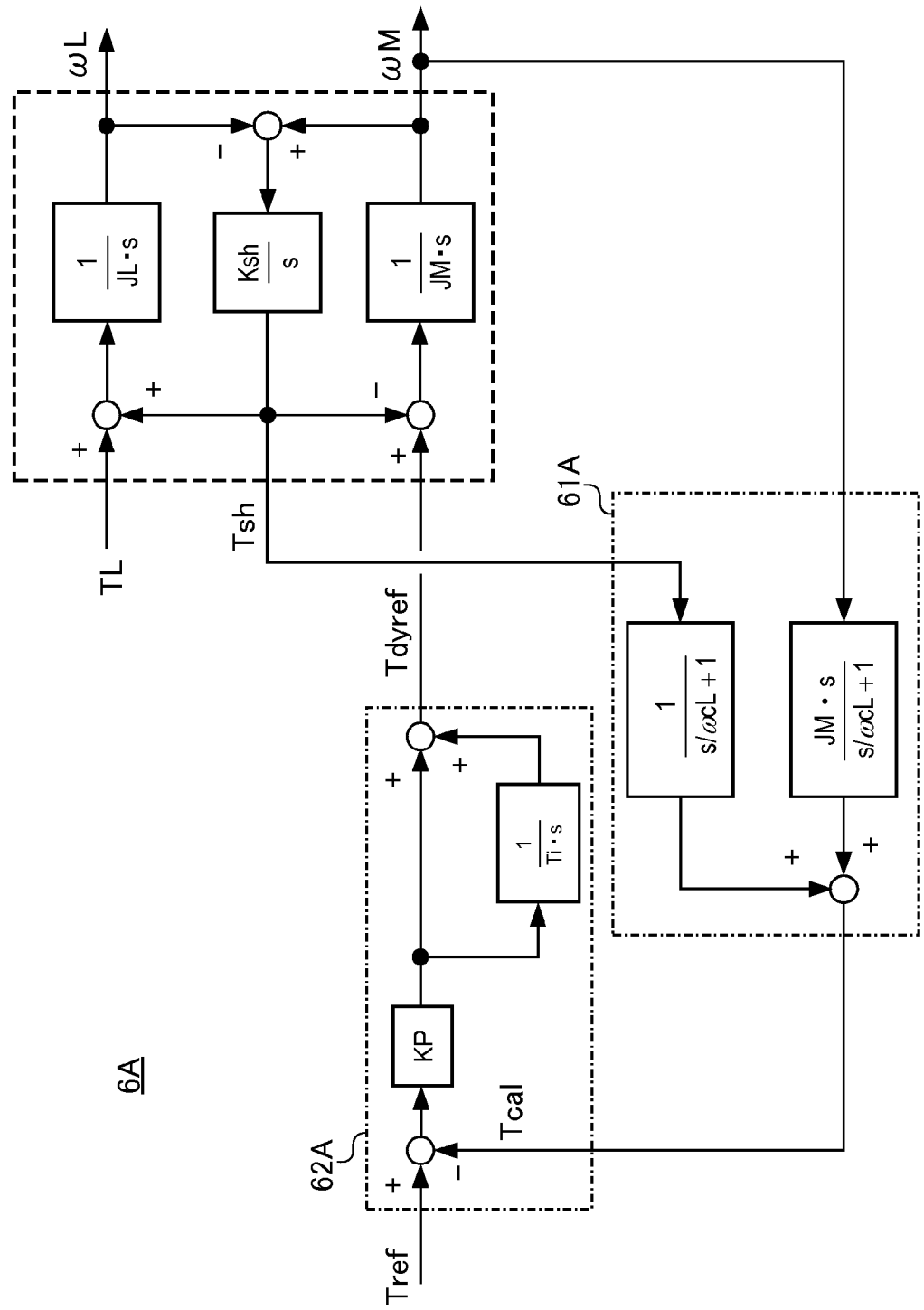
FIG. 3 is a block diagram showing the entirety of a control system of Example 1.

FIG. 3 is a block diagram showing the entirety of a control system to which a torque-control device 6A of the present example is applied. It should be noted that the portion indicated by the bold dotted-line in FIG. 3 is a portion in which the equation of motion of the 2-inertia system model illustrated in the above-mentioned formulas (3-1) to (3-3) is represented by a transfer function.

In the control system shown in FIG. 3, the manipulated variable is the drive torque Tdyref of the dynamometer, the observables are the dynamometer angular velocity ωM and the shaft-torque meter detection value Tsh, and the controlled variable is a calculated-torque value Tcal described later, and it is configured so that the drive torque TL is added to the electric motor side as a disturbance.

The torque-control device 6A of Example 1 is configured to include a calculated-torque calculation unit 61A and a calculated-torque controller 62A. As a command value for the calculated-torque value Tcal, a calculated torque command value Tref (Nm) is input externally to the torque-control device 6A.

The calculated-torque calculation unit 61A calculates the calculated-torque value Tcal corresponding to the detection value of the load cell in the aforementioned oscillating-type dynamometer system, based on formula (4) below, using the shaft-torque meter detection value Tsh and dynamometer angular velocity ωM. Herein, "ωcL" is a cut-off frequency.

$$Tcal = \frac{Tsh}{s/\omega cL + 1} + \frac{JM \cdot \omega M \cdot s}{s/\omega cL + 1} \quad (4)$$

Hereinafter, the sequence of deriving formula (4) above will be explained. First, "Tdyref" in formula (3-3) is considered to correspond to the detection value of the load cell in the system equipped with the load cell, as mentioned in the foregoing. Therefore, as shown in formula (5) below, an ideal value Tcal_ide of the calculated torque corresponding to the detection value of the load cell is defined as a value adding together a value arrived at by multiplying the moment of inertia JM of the dynamometer by the angular acceleration ωM·s of the dynamometer calculated from the dynamometer angular velocity ωM, and the shaft-torque meter detection value Tsh.

$$Tcal\_ide = Tsh + JM \cdot \omega M \cdot s \quad (5)$$

In addition, in order for this calculated torque ideal value Tcal_ide to match the characteristics of the load cell, as shown in formula (6) below, a calculated-torque value is defined by a value arrived at by multiplying a first-order lag low pass filter characterized by the cut-off frequency ωcL on both sides. Formula (4) above is thereby derived. It should be noted that, although the complete derivative term (JM·ωM·s) is included in the definition of the ideal value for the calculated torque by formula (5) above, by multiplying the low-pass filter to make a pseudo differential as shown in formula (6) below, it is possible to make a value with good quality for which noise has been removed.

$$Tcal = \frac{Tcal\_ide}{s/\omega cL + 1} \quad (6)$$

It should be noted that, in the present example, although the calculated-torque value is defined by a value arrived at by multiplying the first-order lag low-pass filter by the ideal value Tcal_ide of formula (5) above, the present invention is not limited thereto. For example, as shown in formula (7) below, the calculated-torque value may be defined by a value arrived at by multiplying a Butterworth-type filter generalized by n order, by the ideal value as shown in formula (7) below. In formula (7) below, n is any positive integer of at least 1, and $a_n$ is a predetermined low-pass filter characteristic constant.

$$Tcal = \frac{Tsh}{(s/\omega cL)^n + a_{n-1}(s/\omega cL)^{n-1} + \ldots + 1} + \frac{JM \cdot \omega M \cdot s}{(s/\omega CL)^n + a_{n-1}(s/\omega cL)^{n-1} + \ldots + 1} \quad (7)$$

The calculated-torque controller 62A calculates the torque-current-command value Tdyref serving as an input to the inverter, based on the calculated torque command value Tref inputted externally and the calculated-torque value Tcal. This calculated-torque controller 62A has a PI control structure characterized by proportional gain KP and integration time constant Ti, as shown in FIG. 3. This proportional gain KP and integration time constant Ti are uniquely determined according to formula (8) below, using the cut-off frequency ωcL introduced in the above-mentioned calculated-torque calculation unit 61A and any frequency response setting value ωc determined between 0 and the cut-off frequency ωcL.

$$KP = \frac{\omega c}{\omega cL}, \quad Ti = \frac{1}{\omega cL} \quad (8)$$

Hereinafter, the sequence of determining the parameters KP and Ti as in formula (8) above will be explained. First, in the present invention, although the calculated-torque value Tcal taking account of the characteristics of the load cell and involving the low-pass filter characteristic characterized by the cut-off frequency ωcL is introduced as shown in formula (4) or (7) above, due to the low-pass filter characteristic introduced at this time affecting the control band, the frequency response characteristic from the input to the inverter (torque-current-command value Tdyref) to the output of the calculated-torque calculation unit (calculated-torque value Tcal) becomes approximately equivalent to the characteristic of the first-order lag low-pass filter shown by formula (9) below.

$$G_{LPF} = \frac{1}{1 + \frac{1}{\omega cL}s} \quad (9)$$

Therefore, when using the transfer function $G_{PI}=KP(1+1/Ti\cdot s)$ of the calculated-torque controller 62A, an open-loop transfer function Go is represented by formula (10) below.

$$G_O = G_{PI} \cdot G_{LPF} = KP\left(1 + \frac{1}{Ti \cdot s}\right) \cdot \left(\frac{1}{1 + \frac{1}{\omega cL}s}\right) \quad (10)$$

Next, when the open-loop transfer function Go assumes having the integral characteristic of Go=ωc/s, the identical equation of formula (11) is derived. Herein, "ωc" is any frequency response setting value determined between 0 and ωcL (0<ωc<ωcL).

$$\frac{\omega c}{s} = \quad (11)$$

$$\left(\frac{KP \cdot s + KP/Ti}{s}\right) \cdot \left(\frac{1}{1 + \frac{1}{\omega cL}s}\right) = \left(\frac{\omega c\left(1 + \frac{1}{\omega cL}s\right)}{s}\right) \cdot \left(\frac{1}{1 + \frac{1}{\omega cL}s}\right)$$

Furthermore, by comparing coefficients in formula (11), the proportional gain KP and integration time constant Ti are uniquely determined as shown in formula (8) above.

The following effects are exerted according to the present example.

(1) With the present example, the calculated-torque value Tcal corresponding to the detection value of the load cell is calculated by the calculated-torque calculation unit 61A, and the torque-current-command value Tdyref is calculated by the calculated-torque controller 62A with the calculated-torque value Tcal as a controlled variable according to the command value Tref input externally. Since control equivalent to torque control defining the detection value of the load cell as the controlled variable is performed in the system equipped with a shaft-torque meter, it is possible to perform evaluation of equivalence with the system equipped with a load cell.

(2) In the present example, by defining the calculated-torque value Tcal with a value arrived at by multiplying an $n^{th}$-order Butterworth-type filter by the ideal value Tcal_ide of the calculated torque, the calculated-torque value can be made to match the characteristic of the load cell, as well as being able to make a value with good properties free of an exact derivative term.

(3) In the present example, by determining the proportional gain KP and integration time constant Ti of the calculated-torque controller 62A by the cut-off frequency $\omega cL$ introduced to the calculated-torque value Tcal and any frequency response setting value $\omega c$ set between 0 and $\omega cL$ as shown in formula (8) above, the adjustment of adjustable parameters is facilitated, as well as being able to resolve the uncertainty depending on the person making adjustment to the utmost; therefore, more uniform evaluation becomes possible. In addition, by determining the adjustable parameter in this way, in the case of controlling according to the settings and a stable result not being obtained, it is conversely possible to assume that there is a malfunction in the system.

Example 2

Next, Example 2 of the torque-control device of the above-mentioned embodiment will be explained while referencing the drawings.

Figure 4:
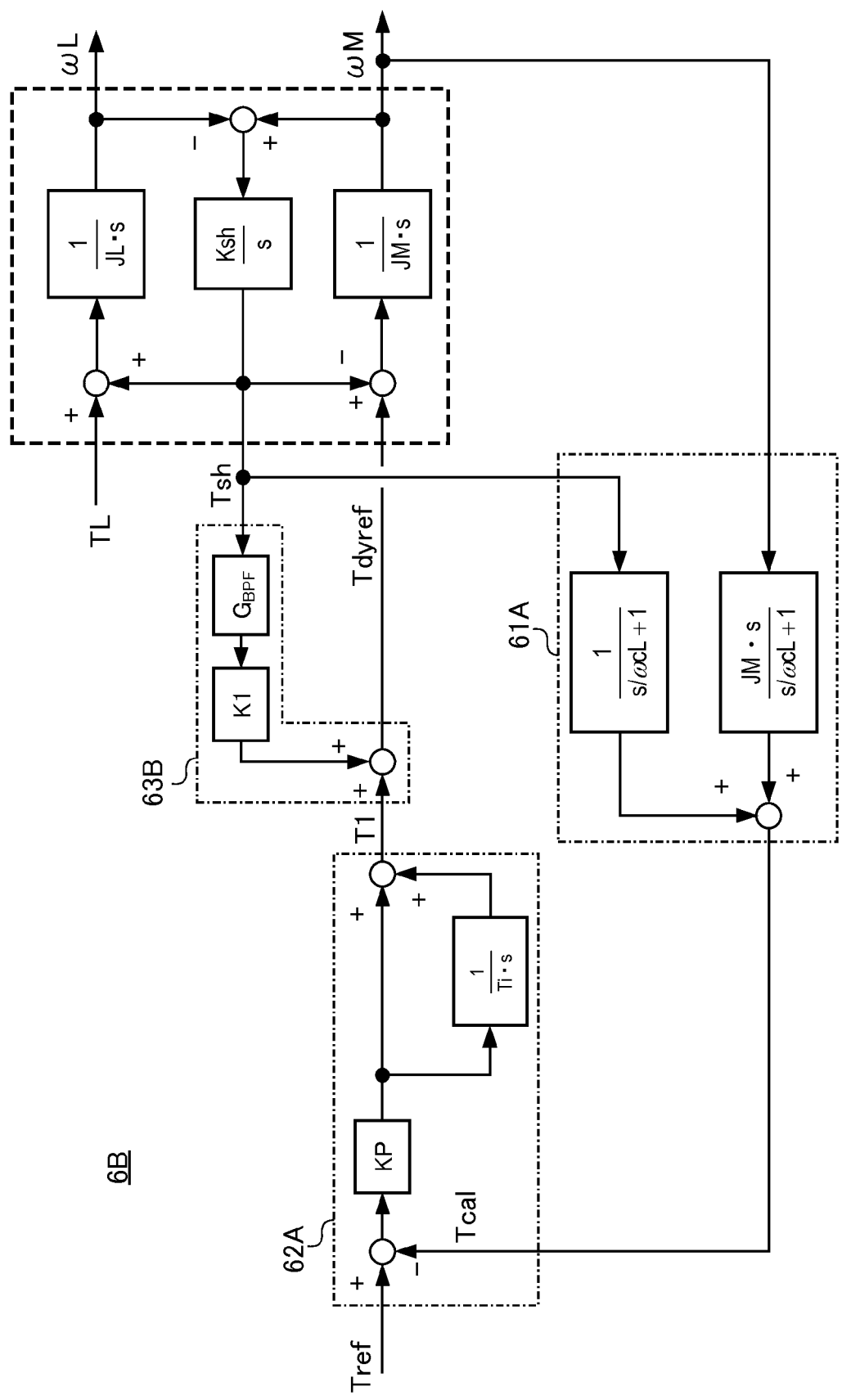
FIG. 4 is a block diagram showing the entirety of a control system of Example 2.

FIG. 4 is a block diagram showing the configuration of a torque-control device 6B. The torque-control device 6B of the present example differs compared to the above-mentioned Example in the point of further including a shaft-torque-detection compensation unit 63B.

The shaft-torque-detection compensation unit 63B calculates a shaft-torque-detection-compensation amount Tsh_K by multiplying a filter transfer function $G_{BPF}$ and suppression gain K1 by the shaft-torque meter detection value Tsh, and adds this to the torque-current-command value T1 calculated by the calculated-torque controller 62A, so as to correct the torque-current-command value T1. In the present example, a value arrived at by adding the shaft-torque-detection-compensation amount Tsh_K calculated by the shaft-torque-detection compensation unit 63B to the torque-current-command value T1 calculated by the calculated-torque controller 62A becomes the final torque-current-command value Tdyref.

The suppression gain K1 is adjusted between a value greater than 0 and a value smaller than 1. For the filter transfer function $G_{BPF}(s)$, a band-pass filter like that represented by formula (12) below is used. In formula (12) below, $B\omega 1$ is the center frequency (rad/s). Pg1 is the peak gain. BQ1 is the Q value, and when ±3 dB width (bandwidth) from the center frequency $B\omega 1$ is set as Bwidth1, the Q value BQ1 is represented by $B\omega 1/\text{Bwidth1}$.

$$G_{BPF} = \frac{\frac{B\omega 1}{BQ1} \cdot s}{s^2 + Pg1 \cdot \frac{B\omega 1}{BQ1} \cdot s + B\omega 1^2} \quad (12)$$

Herein, in the filter transfer function $G_{BPF}(s)$ shown in formula (12) above, the peak gain Pg1 is set to 1, for example, and the center frequency $B\omega 1$ and bandwidth Bwidth1 are set so that the resonance frequency of the mechanical system is included in the bandwidth Bwidth1.

Figure 5:
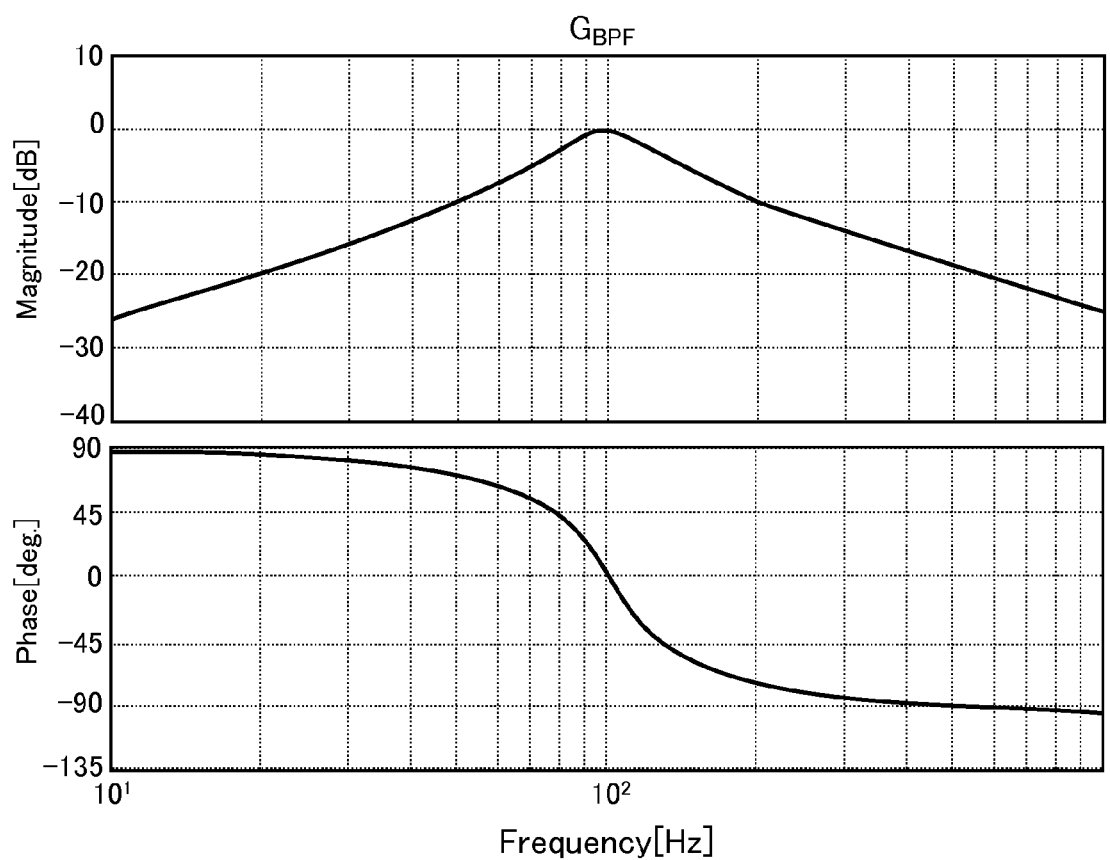
FIG. 5 is a graph showing the frequency characteristics of a filter transfer function $G_{BPF}$ of Example 2.

FIG. 5 is a graph showing the frequency characteristics of the filter transfer function $G_{BPF}$. FIG. 5 shows an example of the filter transfer function $G_{BPF}$ set as $B\omega 1=100(\text{Hz})$, Bwidth1=50(Hz), Pg1=1, under the assumption that there is a resonance point of the mechanical system in the vicinity of 100 Hz. In this way, the filter transfer function $G_{BPF}$ of the shaft-torque-detection compensation unit 63B is set with only this resonance frequency and the vicinity thereof as the passband, in accordance with the resonance frequency of the mechanical system provided in advance.

In addition to the effects of the above-mentioned (1) to (3), the following effect is exerted according to the present example.

(4) In the present example, by correcting the torque-current-command value T1 calculated by the calculated-torque controller 62A with the shaft-torque-detection compensation unit 63B, the resonance gain of the mechanical system consisting of the load device and dynamometer is suppressed, and thus highly-responsive calculated dynamo-torque control becomes possible. In addition, by configuring to compensate only the resonance frequency band of the mechanical system, in the case of using in combination with another compensator such as a disturbance observer, the shaft-torque-detection compensation unit 63B suppresses the interference with this, a result of which stable torque control becomes possible over the entire frequency band.

Modified Example of Example 2

Next, a modified example of Example 2 will be explained in detail by referencing the drawings.

Figure 6:
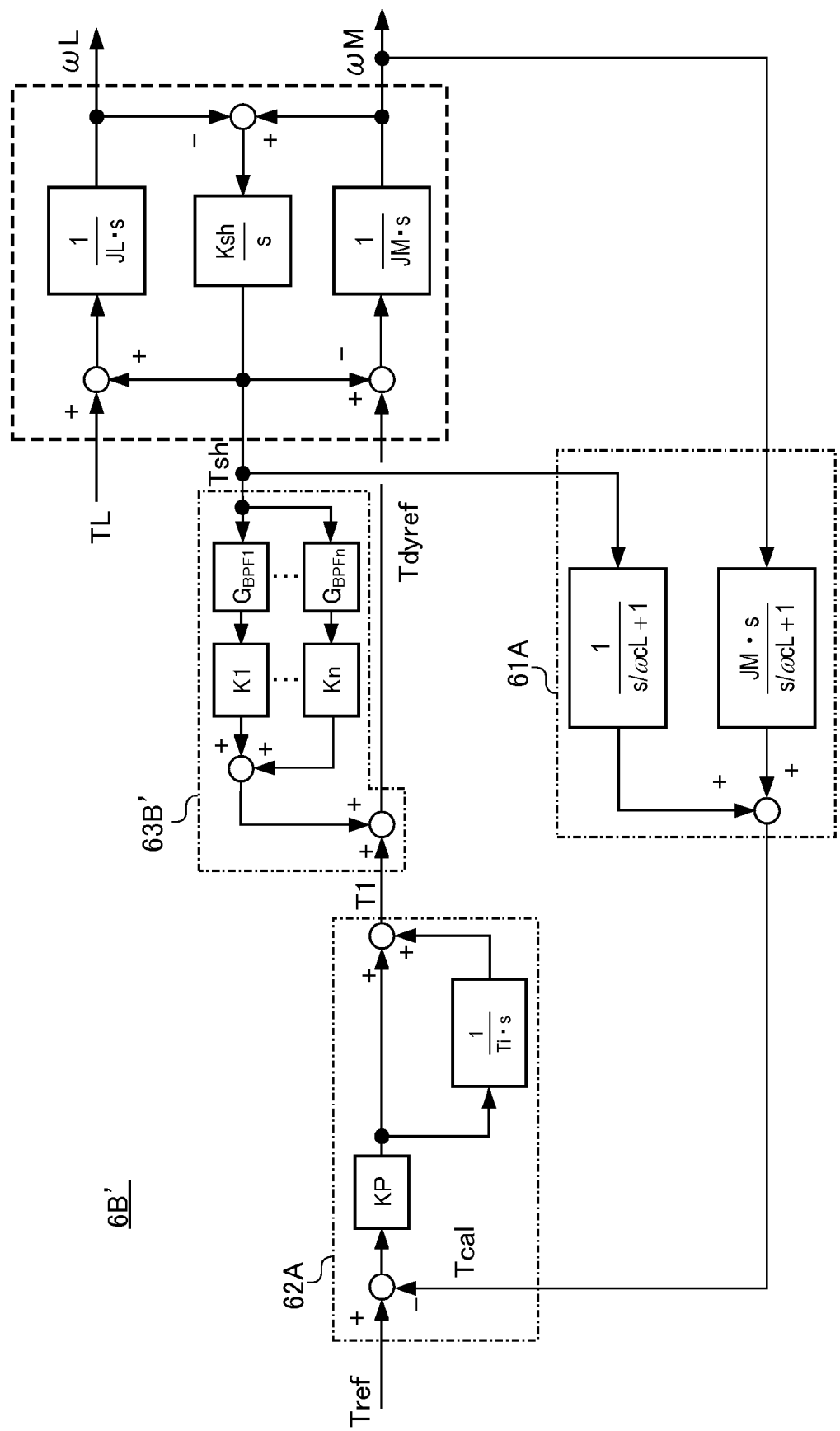
FIG. 6 is a block diagram showing the entirety of a control system of a modified example of Example 2.

FIG. 6 is a block diagram showing the entirety of a control system to which the torque-control device 6B' of the present modified example is applied. The configuration of the shaft-torque-detection compensation unit 63B' differs comparing with the above Example 2 shown in FIG. 4.

Although simplified to the 2-inertia system model in the above-mentioned example, generally, a plurality of resonance points exist. The shaft-torque-detection compensation unit 63B' of the present modified example assumes that a plurality of resonance points exist, and is configured by joining a plurality of filter transfer functions $G_{BPFn}$ and suppression gains Kn set for each of the resonance frequencies in parallel. More specifically, the shaft-torque-detection compensation unit 63B' sets filter transfer functions $G_{BPFn}$ and suppression gains Kn in the aforementioned way for each of the resonance frequencies, and establishes a value summing all of the compensation amounts Tsh_Kn obtained by multiplying the shaft-torque meter detection value Tsh by each of the filter transfer functions $G_{BPFn}$ and suppression gains Kn, as the shaft-torque-detection-compensation amount Tsh_K.

The $n^{th}$ suppression gain Kn corresponding to an $n^{th}$ resonance point is set between a value greater than 0 and a value less than 1, and for the $n^{th}$ filter transfer function $G_{BPFn}$, a bandpass filter is used that is characterized by a center frequency Bωn, peak gain Pgn, Q value BQn (=Bωn/Bwidthn) and bandwidth Bwidthn, like that of formula (13) below. The center frequency Bωn and bandwidth Bwidthn are set so that the corresponding resonance frequency is included in the bandwidth Bwidthn, as mentioned above.

$$G_{BPFn} = \frac{\frac{B\omega n}{BQn} \cdot s}{s^2 + Pgn \cdot \frac{B\omega n}{BQn} \cdot s + B\omega n^2} \qquad (13)$$

In addition to the effects of the above-mentioned (1) to (4), the following effect is exerted according to the present example.

(5) Since a plurality of resonance frequencies are generally present, by joining the filter transfer function $G_{BPFn}$ and the suppression gain K1 thereof set for each resonance frequency in parallel in the present example, each resonance gain can be suitably suppressed.

Example 3

Next, Example 3 of a torque-control device of the above-mentioned embodiment will be explained while referencing the drawings.

Figure 7:
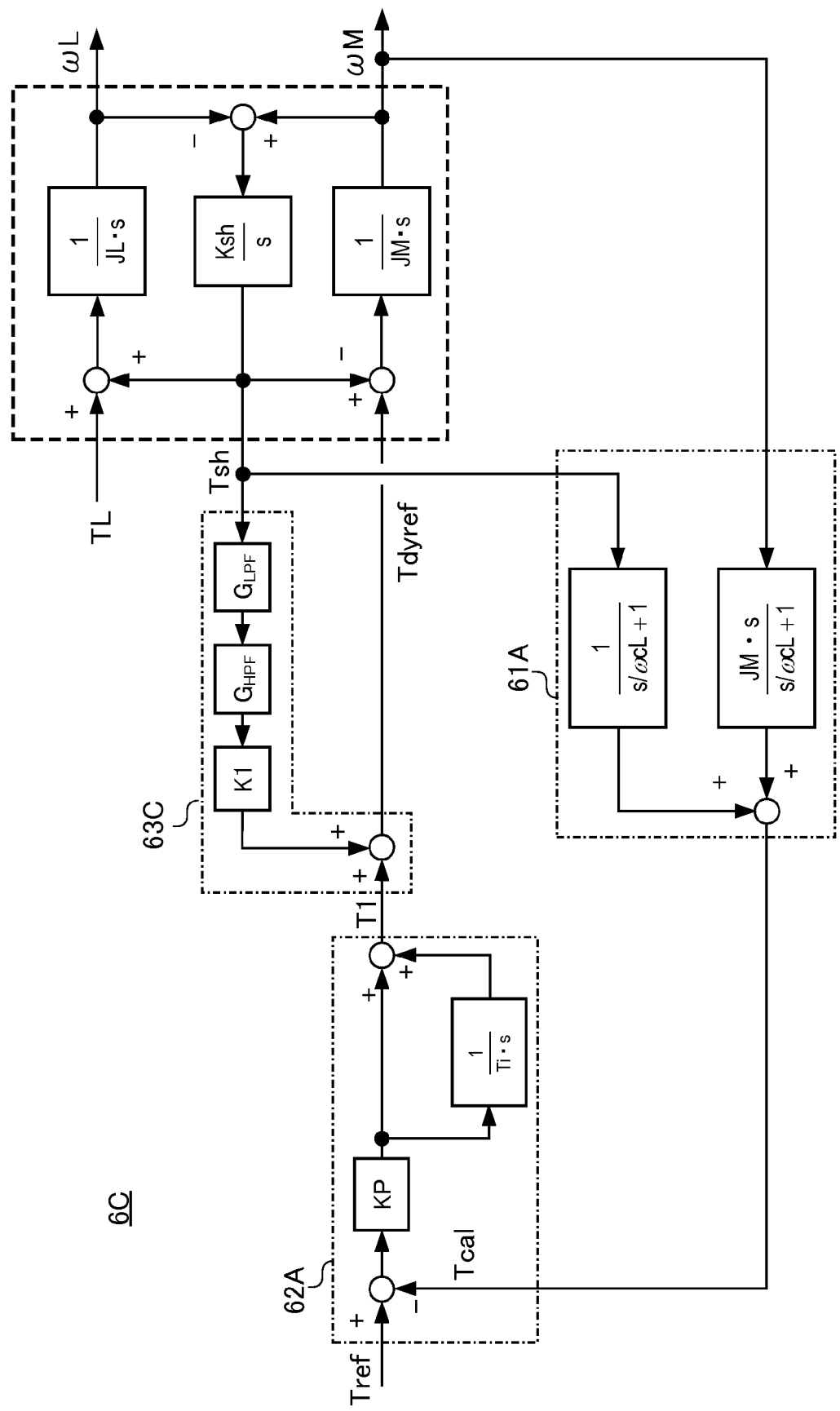
FIG. 7 is a block diagram showing the entirety of a control system of Example 3.

FIG. 7 is a block diagram showing an entirety of a control system to which a torque-control device 6C of the present example is applied. It should be noted that, for the torque-control device 6C of the present example, the configuration of the shaft-torque-detection compensation unit 63C differs compared to the above-mentioned Example 2.

The shaft-torque-detection compensation unit 63C calculates the shaft-torque-detection-compensation amount Tsh_K by multiplying the filter transfer functions $G_{LFP}(s)$ and $G_{HPF}(s)$ and suppression gain K1 by the shaft-torque meter detection value Tsh, and adds this to the torque-current-command value T1 calculated by the calculated-torque controller 62A, so as to correct the torque-current-command value T1.

The suppression gain K1 is adjusted between a value greater than 0 and a value less than 1. For the filter transfer function $G_{LFP}(s)$ and filter transfer function $G_{HPF}(s)$, a low-pass filter characterized by the cut-off frequency LPFωc and a high-pass filter characterized by the cut-off frequency HPFωc are respectively used, as shown in formula (14) below, for example.

$$G_{LPF} = \frac{1}{1 + \frac{1}{LPF\omega c} \cdot s},$$

$$G_{HPF} = \frac{\frac{1}{HPF\omega c} \cdot s}{1 + \frac{1}{HPF\omega c} \cdot s} \qquad (14)$$

Herein, since substantially the same characteristics as the bandpass filter shown in formula (12) above are expressed by that arrived at by connecting a low-pass filter and high-pass filter in series, the cut-off frequency LPFωc is set to a value larger than the cut-off frequency HPFωc. In addition, similarly to setting the resonance frequency of the mechanical system within the bandwidth of the bandpass filter in Example 2, the filter transfer functions $G_{LPF}$ and $G_{HPF}$ are set so that the above-mentioned resonance frequency is included in the bandwidth between the cut-off frequencies HPFωc and LPFωc thereof.

Figure 8:
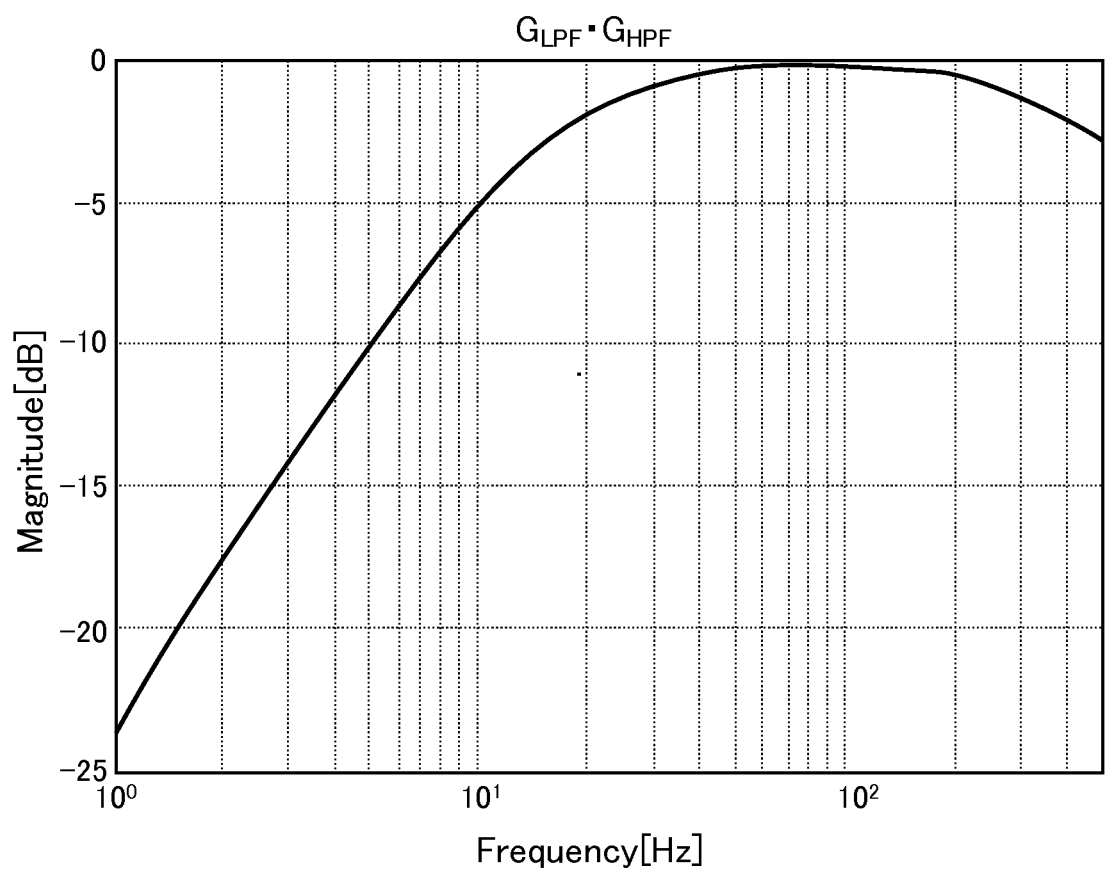
FIG. 8 is a graph showing the frequency characteristics of filter transfer functions $G_{LPF}$ and $G_{HPF}$ of Example 3.

FIG. 8 is a graph showing the frequency characteristics of the filter transfer functions $G_{LPF}$ and $G_{HPF}$. FIG. 8 shows an example of the filter transfer functions $G_{LPF}$ and $G_{HPF}$ set under the assumption that there is a resonance point of the mechanical system in the vicinity of 100 Hz, similarly to FIG. 5.

In addition to the effects of the above-mentioned (1) to (4), the following effect is exerted according to the present example.

(6) As is clear when comparing between the frequency characteristics of the filter transfer functions $G_{LPF}$ and $G_{HPF}$ shown in FIG. 8 and the frequency characteristics of the filter transfer functions $G_{LPF}$ and $G_{HPF}$ shown in FIG. 5, configuring by connecting the low-pass filter and high-pass filter in series tends to set the bandwidth of the peak gain vicinity wider. For this reason, when compared with the above-mentioned Example 2, it is possible to improve the degree of freedom in design of the shaft-torque-detection compensation unit.

Modified Example of Example 3

Next, a modified example of Example 3 will be explained in detail by referencing the drawings.

Figure 9:
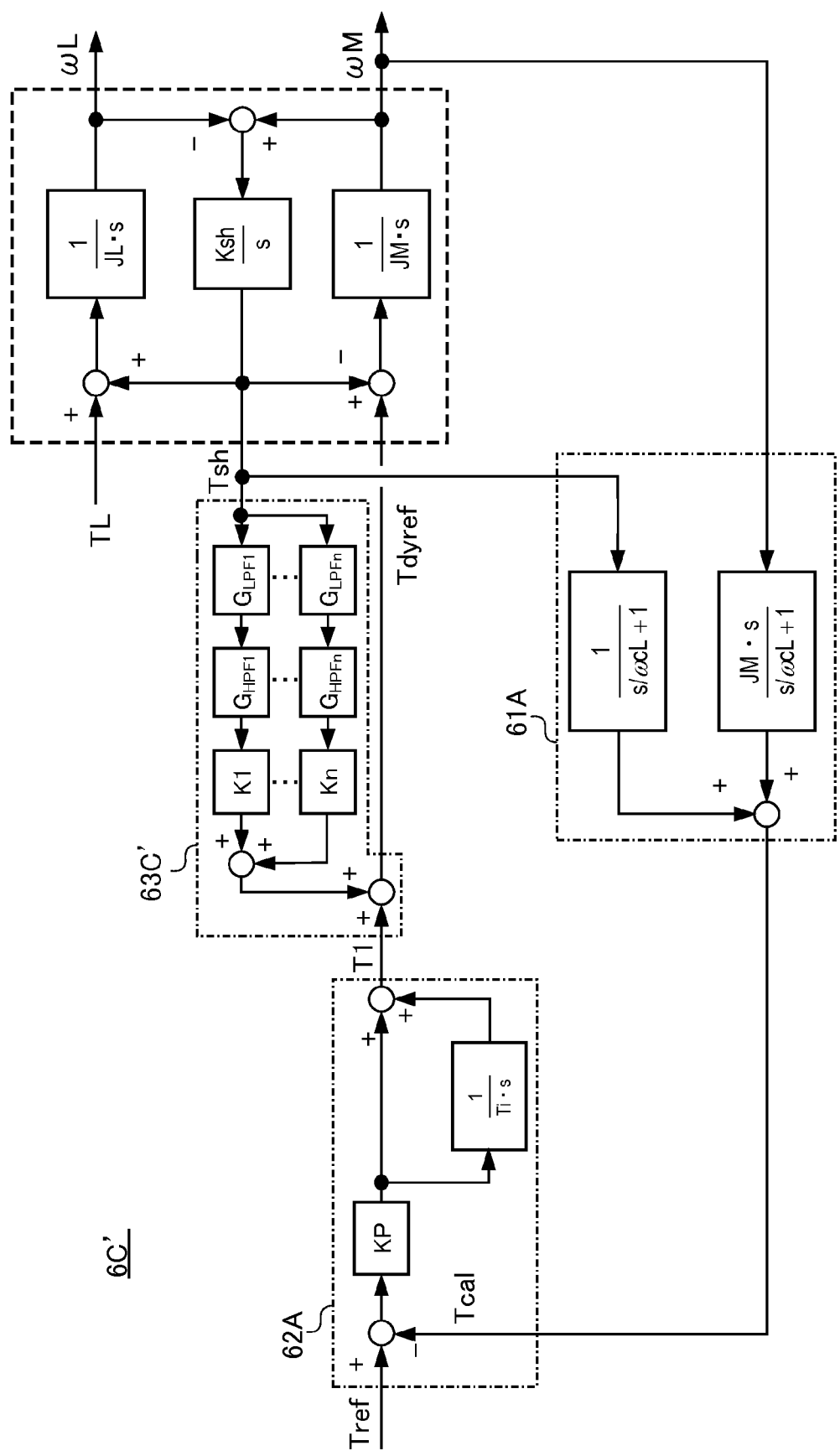
FIG. 9 is a block diagram showing the entirety of a control system of a modified example of Example 3.

FIG. 9 is a block diagram showing the entirety of a control system to which a torque-control device 6C' of the present modified example is applied. Comparing with the above-mentioned Example 3 shown in FIG. 7, the configuration of the shaft-torque-detection compensation unit 63C' differs.

The shaft-torque-detection compensation unit 63C' of the present modified example assumes that a plurality of resonance points exist, and is configured by joining a plurality of the filter transfer functions $G_{LPFn}$ and $G_{HPFn}$ set for each resonance frequency and suppression gain Kn in parallel. More specifically, the shaft-torque-detection compensation unit 63C' sets the filter transfer functions $G_{LPFn}$ and $G_{BPFn}$ and suppression gains Kn as explained in the above-mentioned Example 2 for each resonance frequency, and establishes a value summing all of the compensation amounts Tsh_Kn obtained by multiplying the shaft-torque meter detection value Tsh by each of the filter transfer functions $G_{LPFn}$ and $G_{HPFn}$ and suppression gains Kn, as the shaft-torque-detection-compensation amount Tsh_K.

Substantially the same effects as the effects of the above-mentioned (1) to (6) are exerted according to the present modified example.

The invention claimed is:

1. A dynamometer system comprising:
   a dynamometer that is connected by a common shaft to a load device;
   an inverter that supplies electric power to the dynamometer;
   an encoder that detects an angular velocity of the dynamometer;
   a shaft-torque meter that detects shaft torque between the load device and the dynamometer; and
   a control device that controls the dynamometer based on a detection value of the encoder and a detection value of the shaft-torque meter,
   wherein the control device includes:
   a calculated-torque calculation unit that calculates a calculated-torque value by totaling a value arrived at by multiplying the moment of inertia of the dynamometer by the angular acceleration of the dynamometer calculated from the detection value of the encoder, and the detection value of the shaft-torque meter; and a calculated-torque controller that calculates a torque-current-command value to serve as an input to the inverter, based on a command value relative to the calculated-torque value inputted externally, and the calculated-torque value.

2. The dynamometer system according to claim 1, wherein the calculated-torque calculation unit calculates the calculated-torque value by way of the formula below, wherein Tsh is the detection value of the shaft-torque meter, JM is the moment of inertia of the dynamometer, ωM is the detection value of the encoder, s is a Laplace operator, ωcL is a cut-off frequency, n is any positive integer of at least 1, and $a_n$ is a predetermined low-pass filter characteristic constant:

$$Tcal = \frac{Tsh}{(s/\omega cL)^n + a_{n-1}(s/\omega cL)^{n-1} + \ldots + 1} + \frac{JM \cdot \omega M \cdot s}{(s/\omega CL)^n + a_{n-1}(s/\omega cL)^{n-1} + \ldots + 1}.$$

3. The dynamometer system according to claim 2, wherein the calculated-torque controller has a PI control structure characterized by a proportional gain KP and integration time constant Ti, and wherein the proportional gain KP and the integration time constant Ti are determined by way of the formula below, using a cut-off frequency ωcL of the calculated-torque calculation unit and any frequency response setting value ωc determined between 0 and the cut-off frequency ωcL:

$$KP = \frac{\omega c}{\omega cL},$$
$$Ti = \frac{1}{\omega CL}.$$

4. The dynamometer system according to claim 3, wherein the control device further includes a shaft-torque-detection compensation unit that adds a compensation amount obtained by multiplying a filter transfer function and a suppression gain by the detection value of the shaft-torque meter, to the torque-current-command value calculated by the main control unit, so as to correct the torque-current-command value, and wherein the filter transfer function of the shaft-torque-detection compensation unit is set with only a resonance frequency of a mechanical system consisting of the load device and the dynamometer and a vicinity thereof as a passband.

5. The dynamometer system according to claim 2, wherein the calculated-torque controller has a PI control structure characterized by a proportional gain KP and integration time constant Ti, and wherein the frequency response characteristic from input to the inverter to output of the calculated-torque calculation unit is equivalent to the frequency response characteristic of a first-order lag low-pass filter characterized by the cut-off frequency ωcL, and under the condition of an open-loop transfer function having an integral characteristic characterized by any frequency response setting value we determined between 0 and the cut-off frequency ωcL, the proportional gain KP and integration time constant Ti are determined by the cut-off frequency ωL and the frequency response setting value ωc.

6. The dynamometer system according to claim 5, wherein the control device further includes a shaft-torque-detection compensation unit that adds a compensation amount obtained by multiplying a filter transfer function and a suppression gain by the detection value of the shaft-torque meter, to the torque-current-command value calculated by the main control unit, so as to correct the torque-current-command value, and wherein the filter transfer function of the shaft-torque-detection compensation unit is set with only a resonance frequency of a mechanical system consisting of the load device and the dynamometer and a vicinity thereof as a passband.

7. The dynamometer system according to claim 2, wherein the control device further includes a shaft-torque-detection compensation unit that adds a compensation amount obtained by multiplying a filter transfer function and a suppression gain by the detection value of the shaft-torque meter, to the torque-current-command value calculated by the main control unit, so as to correct the torque-current-command value, and wherein the filter transfer function of the shaft-torque-detection compensation unit is set with only a resonance frequency of a mechanical system consisting of the load device and the dynamometer and a vicinity thereof as a passband.

8. The dynamometer system according to claim 1, wherein the control device further includes a shaft-torque-detection compensation unit that adds a compensation amount obtained by multiplying a filter transfer function and a suppression gain by the detection value of the shaft-torque meter, to the torque-current-command value calculated by the main control unit, so as to correct the torque-current-command value, and Wherein the filter transfer function of the shaft-torque-detection compensation unit is set with only a resonance frequency of a mechanical system consisting of the load device and the dynamometer and a vicinity thereof as a passband.

9. The dynamometer system according to claim 8, wherein the filter transfer function of the shaft-torque-detection compensation unit is a bandpass filter set so that the resonance frequency of the mechanical system is included in the bandwidth thereof.

10. The dynamometer system according to claim 9, wherein the shaft-torque-detection compensation unit is configured by joining in parallel a plurality of filter transfer functions and suppression gains thereof set for each of the resonance frequencies, for a plurality of resonance frequencies of the mechanical system.

11. The dynamometer system according to claim 8, wherein the filter transfer function of the shaft-torque-detection compensation unit is configured by connecting a high-pass filter having a cut-off frequency lower than the resonance frequency in series to a low-pass filter having a cut-off frequency higher than the resonance frequency.

12. The dynamometer system according to claim 11, wherein the shaft-torque-detection compensation unit is configured by joining in parallel a plurality of filter transfer functions and suppression gains thereof set for each of the resonance frequencies, for a plurality of resonance frequencies of the mechanical system.

* * * * *